United States Patent
Park et al.

(10) Patent No.: US 9,156,360 B2
(45) Date of Patent: Oct. 13, 2015

(54) BATTERY EXCHANGING-TYPE CHARGING STATION SYSTEM FOR ELECTRIC VEHICLE

(75) Inventors: Jun Seok Park, Seoul (KR); Won-Kyu Kim, Seoul (KR); Hee-Jeing Park, Gunpo-si (KR); Hee Seok Moon, Asan-si (KR); Woongchul Choi, Seoul (KR); Jayil Jeong, Seoul (KR); Chi Man Yu, Bucheon-si (KR); Do Yang Jung, Anyang-si (KR); Yong-hark Shin, Seoul (KR); Jae-Hong Park, Seoul (KR)

(73) Assignee: KOOKMIN UNIVERSITY INDUSTRY ACADEMY COOPERATION FOUNDATION, Seoul (KR)

(*) Notice: Subject to any disclaimer, the term of this patent is extended or adjusted under 35 U.S.C. 154(b) by 428 days.

(21) Appl. No.: 13/539,477

(22) Filed: Jul. 1, 2012

(65) Prior Publication Data

US 2014/0002019 A1    Jan. 2, 2014

(51) Int. Cl.
 *H01M 10/46*    (2006.01)
 *B60L 11/00*    (2006.01)

(52) U.S. Cl.
 CPC ...................................... *B60L 11/00* (2013.01)

(58) Field of Classification Search
 CPC ................................. B65G 21/22; B66F 9/141
 USPC ........... 320/109, 107, 114; 414/281, 282, 284
 See application file for complete search history.

(56) References Cited

U.S. PATENT DOCUMENTS

| | | | | |
|---|---|---|---|---|
| 5,612,606 | A | * | 3/1997 | Guimarin et al. ............. 320/109 |
| 8,624,114 | B2 | * | 1/2014 | Oga et al. .................... 174/72 R |
| 2008/0277173 | A1 | | 11/2008 | Midrouillet et al. |
| 2008/0294283 | A1 | | 11/2008 | Ligrano |
| 2010/0094496 | A1 | | 4/2010 | Hershkovitz |
| 2011/0223459 | A1 | | 9/2011 | Heichal |

FOREIGN PATENT DOCUMENTS

| | | |
|---|---|---|
| CN | 1293149 | 5/2001 |
| CN | 1605514 | 4/2005 |
| CN | 101976731 | 2/2011 |
| CN | 102039876 | 5/2011 |
| DE | 10 2011 108 199 | 1/2012 |
| FR | 2 964 352 | 3/2012 |
| JP | 2003-102110 | 4/2003 |
| JP | 2008-520173 | 6/2008 |
| JP | 2011-217460 | 10/2011 |
| WO | 2011/055687 | 5/2011 |

* cited by examiner

*Primary Examiner* — Edward Tso

(74) *Attorney, Agent, or Firm* — Kile Park Reed & Houtteman PLLC

(57) ABSTRACT

Provided is a battery exchanging type charging station system for an electric vehicle. The battery exchanging type charging station system includes a charging station body formed with a structure in which the electric vehicle freely enters and exits and including a battery loading unit for receiving the battery, a battery replacing robot mounted in the charging station body to perform a battery replacement operation, a charging station control unit to control the battery replacing robot such that the battery replacement operation is performed by controlling the battery replacing robot, an information recognition unit configured to obtain data on an electric vehicle that enters the charging station body and/or data on a type, size, charging state, release date, charging date or the like of the battery, and a charging station control unit that allows a replacement operation of the battery to be performed by controlling the battery replacing robot.

20 Claims, 12 Drawing Sheets

BATTERY EXCHANGING-TYPE CHARGING STATION SYSTEM FOR ELECTRIC VEHICLE

BACKGROUND

1. Field of the Invention

Embodiments of the inventive concept relate to a battery exchanging type charging station system for an electric vehicle and in particular, to a battery exchanging type charging station system for an electric vehicle that can lead the way to proliferation and activation of electric vehicles and promote national interests through a variety of related industrial developments and securement of international competitiveness by building a charging infrastructure in which a battery of an electric vehicle can be exchanged quickly and accurately as well as safely and can be charged easily at any time and in any place based on robotic technology.

2. Description of Related Art

A vehicle, which is essential to human life and socioeconomic activities, is a moving means that moves using fossil energy such as oil. However, fossil energy is a finite resource and is thus becoming depleted over time and the price is constantly rising.

In particular, fossil energy emits various exhaust gases that pollute the environment in the process of use and a large quantity of carbon dioxide that is a main contributing factor to global warming. Thus, in order to reduce carbon dioxide emissions, a variety of research and development activities are being performed throughout all industries in various countries of the world. As an alternative, electric vehicles which move using electricity as an energy source have been developed.

Electric vehicles that have been developed include a pure electric vehicle (battery powered electric vehicle), a hybrid electric vehicle with an electric motor and an engine, a fuel cell electric vehicle, etc. In addition, in order to expand the vitalization and dissemination of electric vehicles, a charge infrastructure by which charging can be easily performed at any time and any place is essential, and thus a variety of research thereon is underway.

However, since electric vehicles use batteries charged in a plug-in manner, unlike a vehicle that uses oil (gasoline, diesel, etc.) or natural gas, the long charging time is inconvenient for drivers and removes any economic efficiency for companies operating charging facilities.

In order to solve the above problems, in recent years, charging technology including a method of precharging a battery and exchanging the fully charged battery instead of charging of a battery in an electric vehicle directly (hereinafter referred to as a "battery replacing method") has been proposed.

Such a battery replacement method has an advantage in that when a driver in need of charging visits a battery charge station, the driver can conveniently replace his or her pre-used with a precharged battery and mount the precharged battery.

However, when a consumer visits a charging station in order to replace a battery, the battery mounted in an electric vehicle should be separated, removed, and re-mounted after a battery that matches a type of the electric vehicle or a type of the battery that is already mounted is found. Thus, there is a problem in that a lot of time is consumed. In addition, a professional worker who can replace a battery is required in order to replace the battery. Thus, there are problems in that replacement cost, which customers end up bearing, may be increased.

SUMMARY

Embodiments of the inventive concept provide a battery exchanging type charging station system for an electric vehicle that can lead the way to proliferation and activation of electric vehicles and promote national interests through a variety of related industrial developments and securement of international competitiveness by building a charging infrastructure in which a battery of an electric vehicle can be exchanged quickly and accurately as well as safely and can be charged easily at any time and in any place based on robotic technology.

In accordance with one aspect of the invention, there is a battery exchanging type charging station system for an electric vehicle, comprising: a charging type battery installed on a battery mounting module of the electric vehicle; a charging station body formed with a structure in which the electric vehicle freely enters and exits and including a battery loading unit for receiving the battery; a battery replacing robot mounted in the charging station body to perform a battery replacement operation; and a charging station control unit to control the battery replacing robot such that the battery replacement operation is performed by controlling the battery replacing robot.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION OF THE EMBODIMENTS

Figure 1:
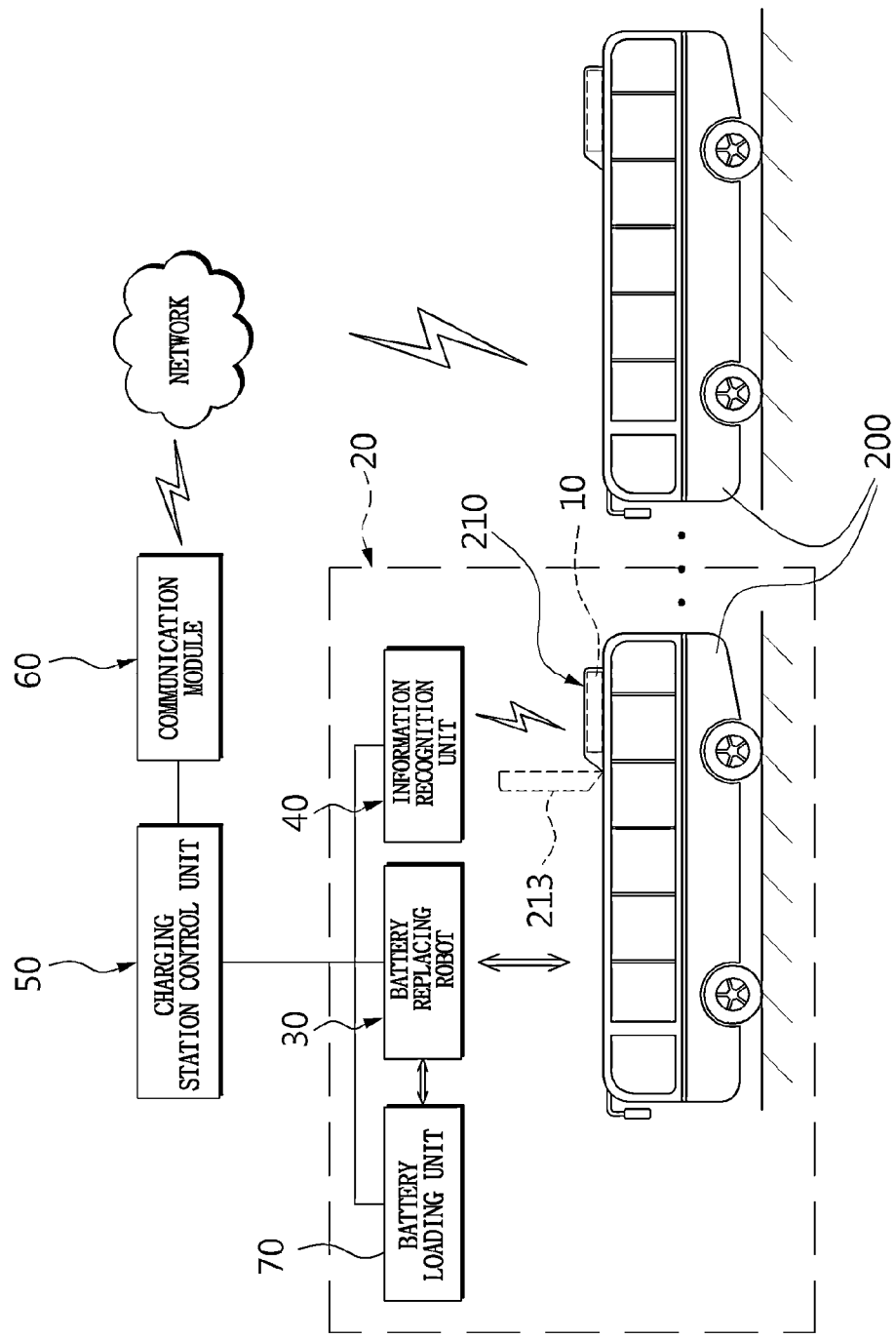
FIG. 1 is a block diagram for explaining a battery exchanging type charging station system for an electric vehicle in accordance with an embodiment of the inventive concept.

Various embodiments will now be described more fully with reference to the accompanying drawings in which some embodiments are shown. These inventive concepts may, however, be embodied in different forms and should not be construed as limited to the embodiments set forth herein. Rather, these embodiments are provided so that this disclosure is thorough and complete and fully conveys the inventive concept to those skilled in the art. In the drawings, the sizes and relative sizes of layers and regions may be exaggerated for clarity.

Hereinafter, specific embodiments of the inventive concept will be described with reference to the drawings.

Figure 2:
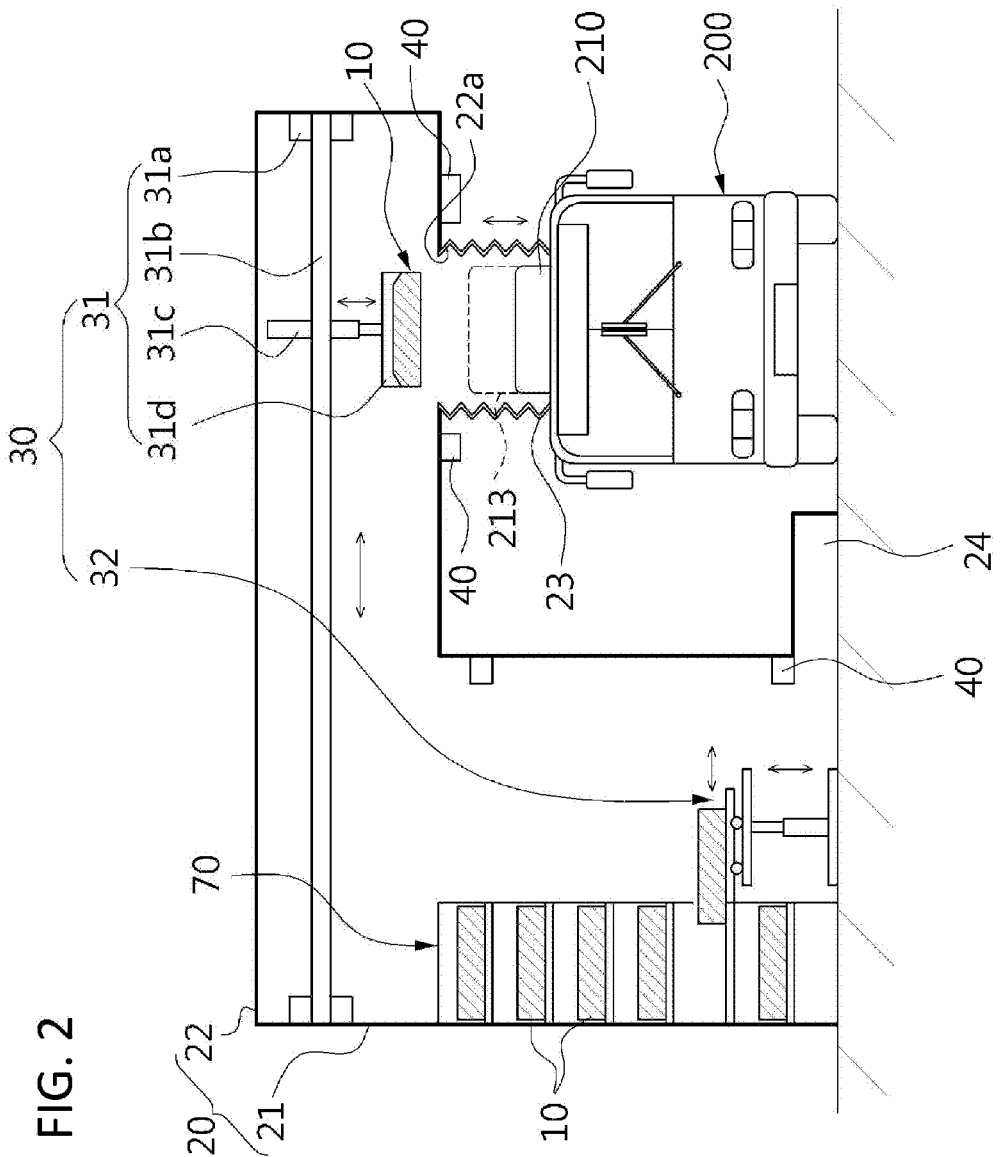
FIG. 2 is a schematic configuration view for explaining a battery exchanging type charging station system for an electric vehicle in accordance with an embodiment of the inventive concept.
Figure 3:
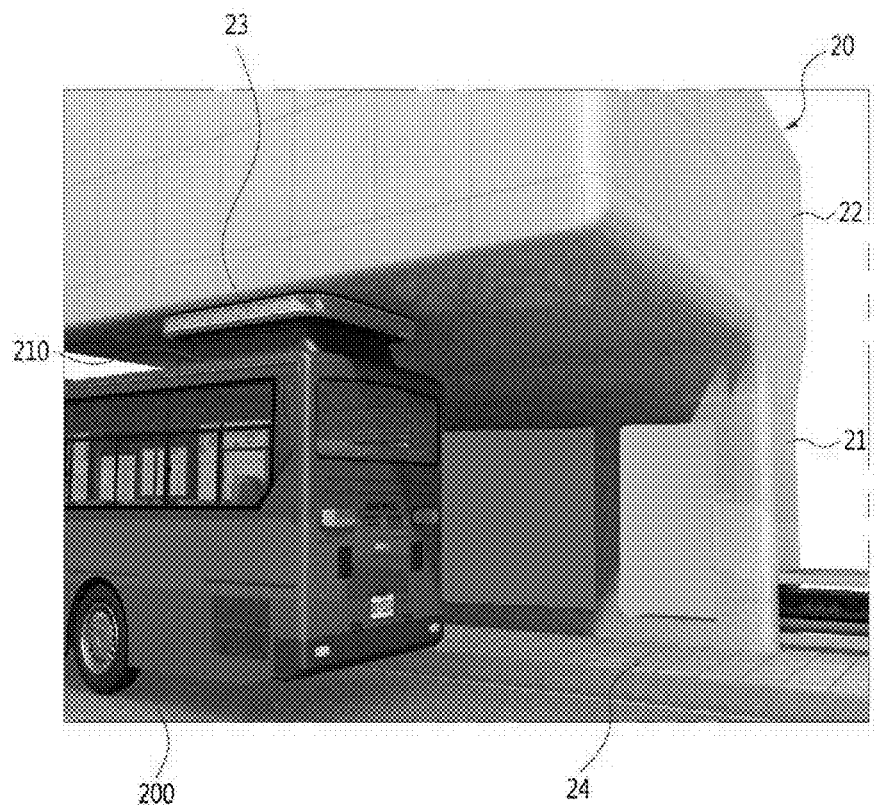
FIG. 3 is a perspective view representing an exterior structure of a battery exchanging type charging station system for an electric vehicle in accordance with an embodiment of the inventive concept.

FIG. 1 is a block diagram for explaining a battery exchanging type charging station system for an electric vehicle in accordance with an embodiment of the inventive concept, FIG. 2 is a schematic configuration view for explaining a battery exchanging type charging station system for an electric vehicle in accordance with an embodiment of the inventive concept, and FIG. 3 is a perspective view representing an exterior structure of a battery exchanging type charging station system for an electric vehicle in accordance with an embodiment of the inventive concept.

Referring to FIGS. 1 to 3, the battery exchanging type charging station system for an electric vehicle 200 in accordance with an embodiment of the inventive concept may include a rechargeable battery 10 mounted on a battery mounting module 210 of the electric vehicle 200, a charging station body 20 in which a fully charged battery is stored and a battery replacing operation is performed, a battery replacing robot 30, a information recognition unit 40, and a charging station control unit 50 that allows a replacing operation of the battery 10 to be performed by controlling the battery replacing robot 30 according to information obtained from the information recognition unit 40. The battery exchanging type charging station system is implemented in a battery exchanging method by which the entire battery can be exchanged so as to replace a battery applied as an energy source of the electric vehicle quickly and accurately based on robotic technology.

Figure 4:
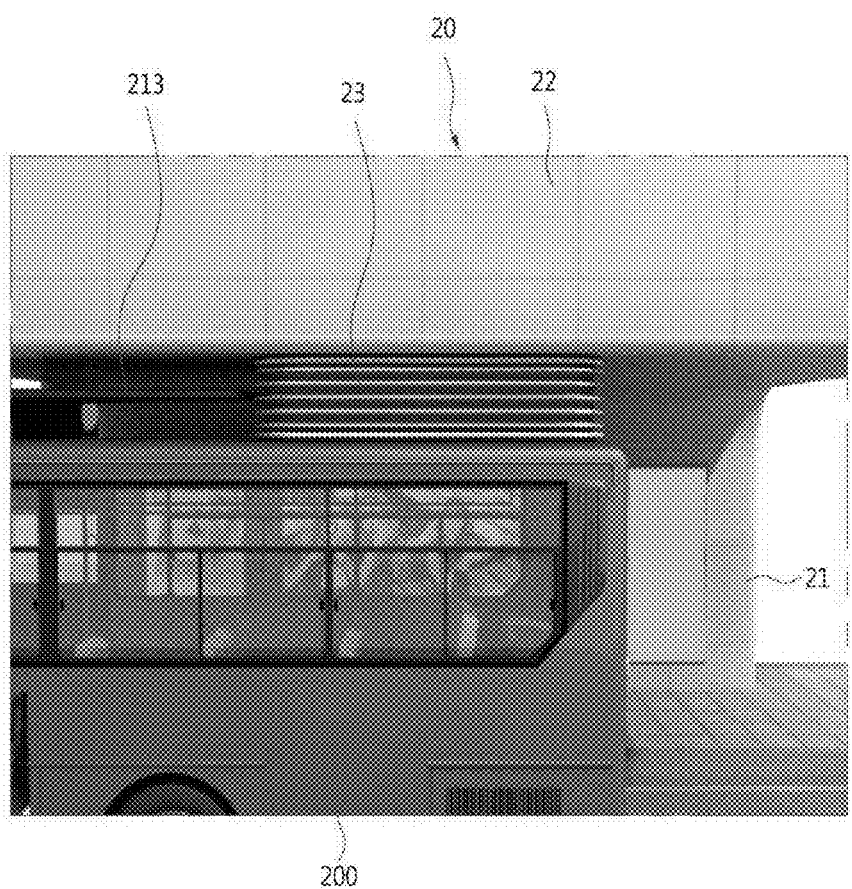
FIG. 4 is an expanded perspective view representing a main portion of an exterior structure when exchanging a battery in the battery exchanging type charging station system for the electric vehicle in accordance with an embodiment of the inventive concept.
Figure 5:
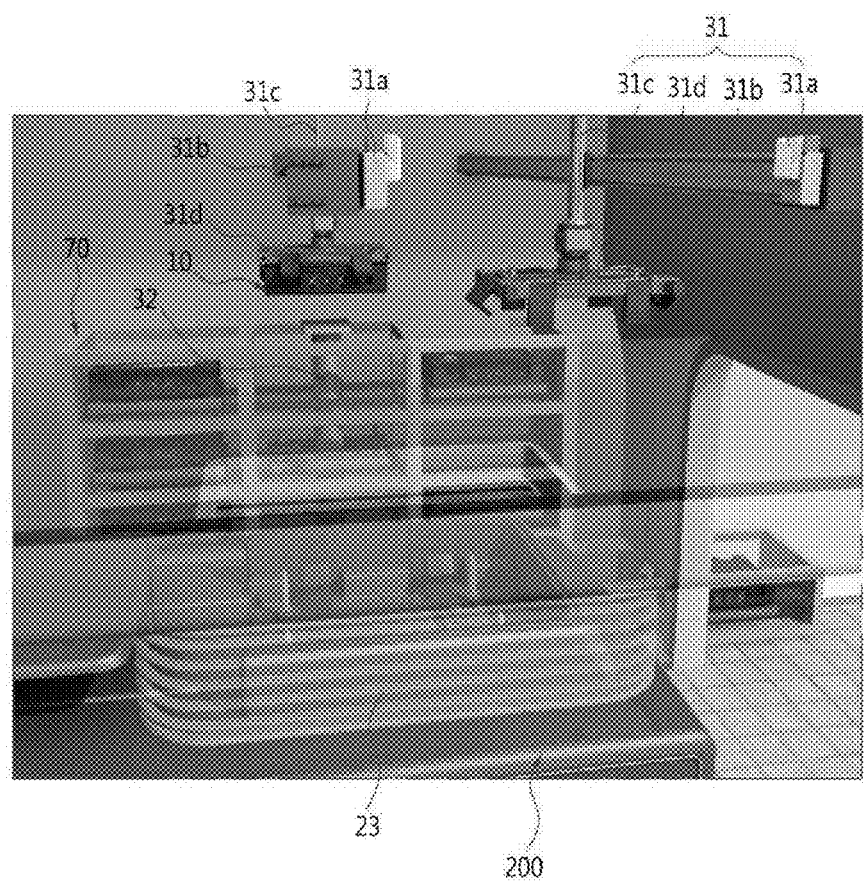
FIG. 5 is an expanded perspective view representing a main portion of an interior structure when exchanging a battery in the battery exchanging type charging station system for the electric vehicle in accordance with an embodiment of the inventive concept.

FIG. 4 is an expanded perspective view representing a main portion of an exterior structure when exchanging a battery in the battery exchanging type charging station system for the electric vehicle in accordance with an embodiment of the inventive concept; and FIG. 5 is an expanded perspective view representing a main portion of an interior structure when exchanging a battery in the battery exchanging type charging station system for the electric vehicle in accordance with an embodiment of the inventive concept.

The charging station body 20 is a structure that actually performs an operation of replacing the battery after the electric vehicle 200 enters a charging station, and is formed so as to allow the electric vehicle to freely access the battery charge station. The charging station body 20 includes the battery loading unit 70 for loading the battery.

In addition, the charging station body 20 according to the embodiment is configured to include a vertical body 21 extending in a vertical direction and coming in contact with a road, and a horizontal body 22 extending in a horizontal direction from a top portion of the vertical body 21 toward the road, as shown in FIG. 2. Thus, the battery replacement operation can be performed easily under bad weather conditions such as rain, snow and the like. However, as long as the electric vehicle 200 can enter and exit the battery charge station and the replacement operation can be easily performed, the structure or type of the charging station body 20 is not limited.

In addition, a platform 24 for passengers to use is provided between the vertical body 21 and the road, and a bottom of the horizontal body 22 is provided with at least one outlet 22a for taking the battery 10 out.

In particular, the charging station body 20 includes the protection guide 23 for sealing the battery mounting module 210 which mounts the battery when the electric vehicle 200 enters the charging station, in order to avoid ill effects according to changes in the external environment when replacing the battery 10. The protection guide 23 according to the embodiment is configured of a corrugate tube that is folded toward the battery mounting module 210 in a state in which the battery is mounted inside the charging station body 20 when the battery is being replaced and is unfolded to an original position after the battery is replaced. However, as long as the battery mounting module 210 including the battery can be effectively sealed and protected during the process of replacing the battery, the protection guide 23 may be configured to have various structures without limitation.

In addition, as shown in FIGS. 3 and 4, the protection guide 23 is configured to include a sealed membrane such as a flexible hose which is installed in the outlet 22a disposed at the bottom of the horizontal body 22, and a door driving unit (not shown) which can operate the sealed membrane in the vertical direction under the control of the charging station control unit 50.

Although not illustrated in detail, the door driving unit may include an air pressure unit having a high pressure cylinder operated by pressure air and a control valve for controlling the operation of the high pressure cylinder, or may be an electric actuator.

Figure 6:
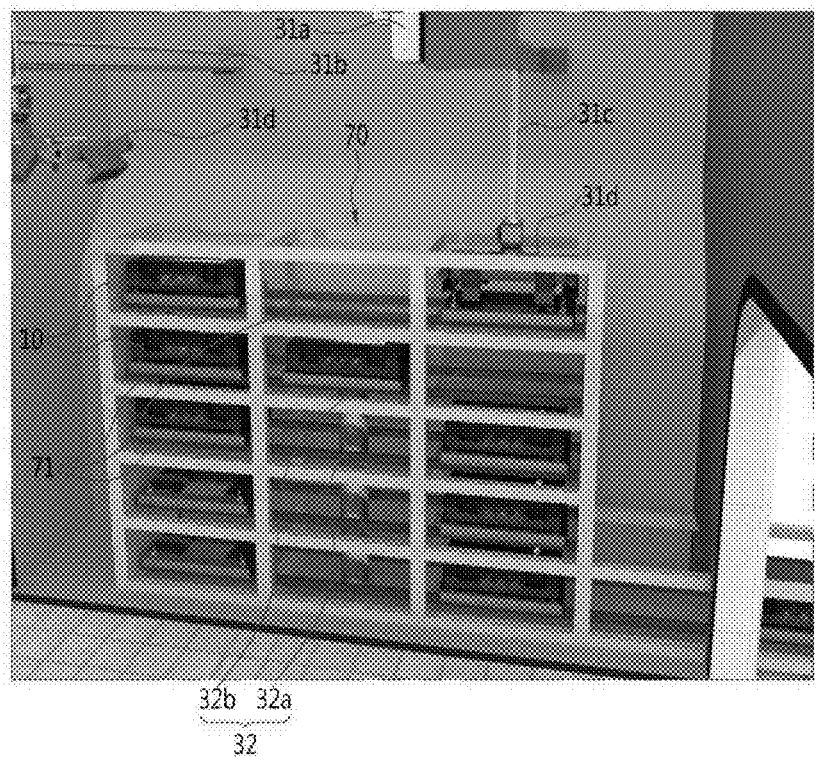
FIGS. 6 and 7 are perspective views for explaining a battery loading unit of a battery exchanging type charging station system for an electric vehicle in accordance with an embodiment of the inventive concept.
Figure 7:
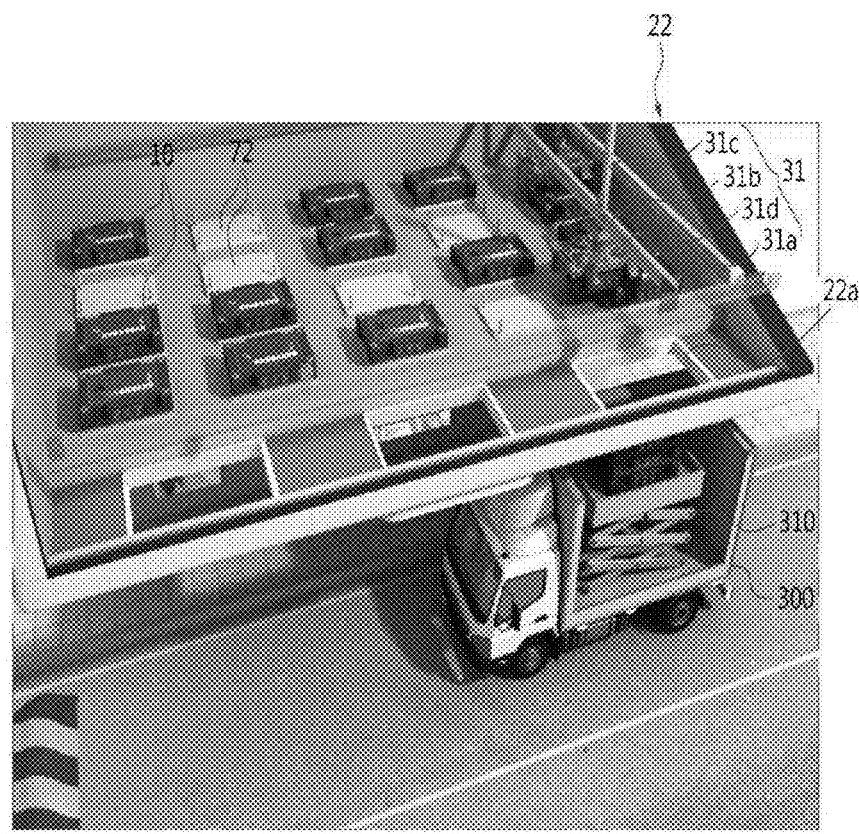

FIGS. 6 and 7 are perspective views explaining a battery loading unit of a battery exchanging type charging station system for an electric vehicle in accordance with an embodiment of the inventive concept. More concretely, FIG. 6 is a diagram illustrating a stacked storage rack type battery loading unit and FIG. 7 is a diagram illustrating a parallel storage rack type battery loading unit.

The battery loading unit 70 may be variously configured according to shapes of the charging station body 20 as a loading rack mounted in the charging station body 20 to store fully charged and discharged batteries 10 used when the battery is replaced. For example, the battery loading unit 70 may be configured to have a stacked storage rack type included in the vertical body 21 in which a plurality of batteries are arranged so as to be formed in a line at the left and right sides and the batteries are again stacked over the upper side of the line in a multi-layer structure, as shown in FIG. 6.

In addition, the battery loading unit 70 may be configured to have a parallel storage rack type in which the plurality of batteries 10 are stored in every direction of the horizontal body. In addition to this, it may be configured to have a mixed storage rack type including the stacked storage rack type and the parallel storage rack type.

In addition, a reference numeral 71 of FIG. 6 may be a moving truck type loading rack in which the batteries are moved on the battery loading unit 70 in order to effectively perform ejection and receipt processes of the battery by a battery ejecting and loading robot 32 to be described later. Also, a reference numeral 72 of FIG. 7 may be a loading rack installed on the battery loading unit 70 of the parallel storage rack type.

Meanwhile, a reference numeral 300 of FIG. 7 may be a battery supply vehicle used when the discharged batteries are charged in an outer charging apparatus and then fully charged batteries are transferred and stored, and a reference numeral 310 may be a lift for elevating the batteries.

Alternatively, in the battery exchanging type charging station system for an electric vehicle according to the embodiment, since a larger number of discharged batteries may be continuously replaced, it is preferable that the batteries be transferred using the battery supply vehicle after the discharged batteries have been fully charged. However, the charging station body 20 may include a power charging apparatus which can autonomously charge the plurality of discharged batteries.

The information recognition unit 40 may be configured to obtain information on an electric vehicle that enters the charging station body 20 and/or information on the battery mounted in the electric vehicle, that is, data of a type, size, charging state, release date, charging date or the like.

The information recognition unit 40 may be applied to a variety of techniques and devices that can be utilized in an information recognition field, such as an image sensor module in which an image of the battery is captured, and the captured image and a stored image are compared to decide a type of the battery, and an RFID technology-based reader.

On the other hand, according to the inventive concept, battery exchanging type charging station system for an electric vehicle may include a communication module 60 that performs or relays communication with the charging station control unit 50 and the electric vehicle via a wired and/or wireless communication unit. Since a communication module 60 can communicate with a transmission unit (not shown) provided in the electric vehicle, a replacing operation can be performed more rapidly by receiving information such as a battery replacement reservation, a position of the electric vehicle, a type of battery and the like, via communication with the electric vehicle and previously controlling the battery replacing robot 30 and the like under control of the charging station control unit 50.

Figure 8A:
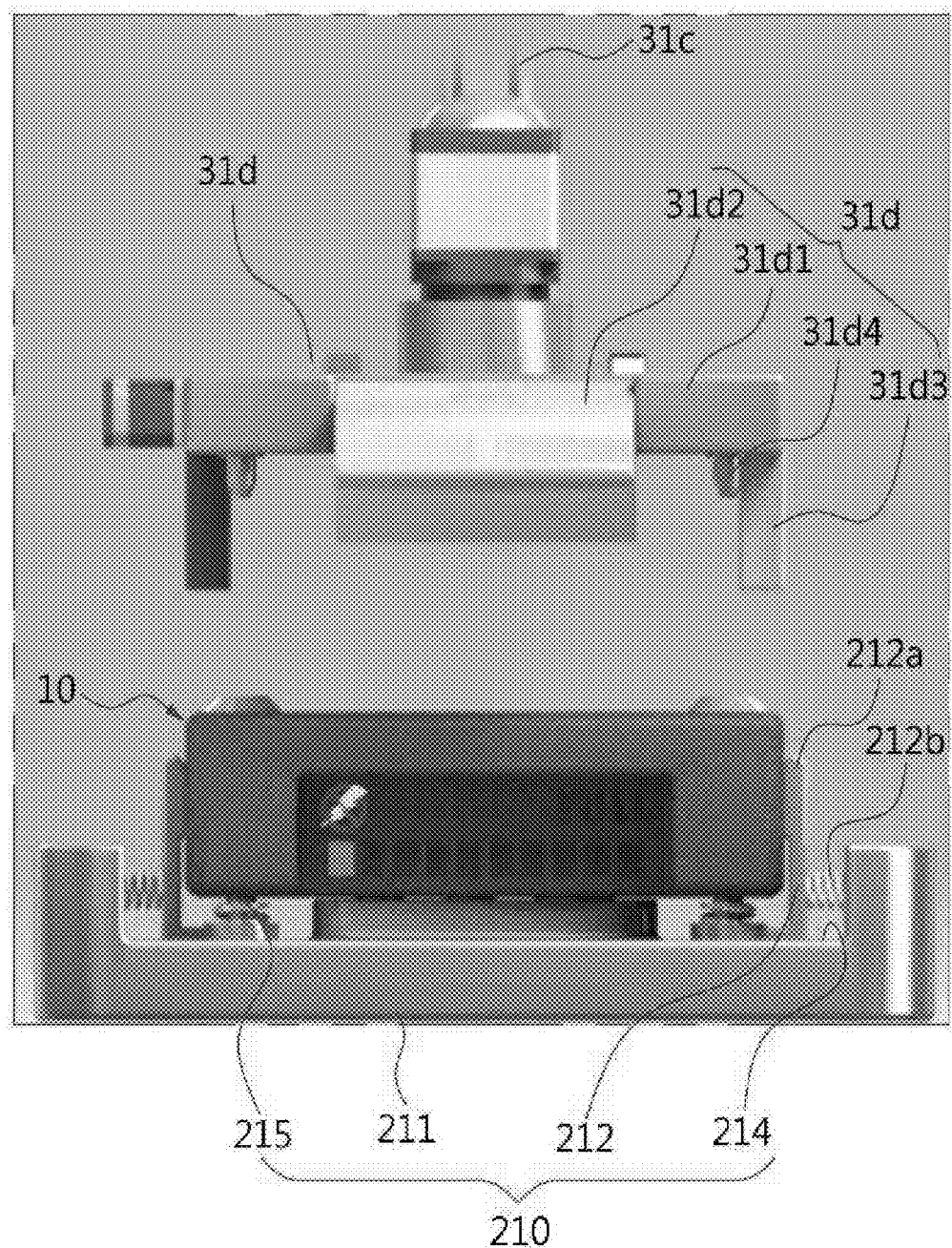
FIGS. 8a to 9b are diagrams for explaining structures and operations of a battery replacing robot and a battery mounting module in a battery exchanging type charging station system for an electric vehicle in accordance with an embodiment of the inventive concept.
Figure 8B:
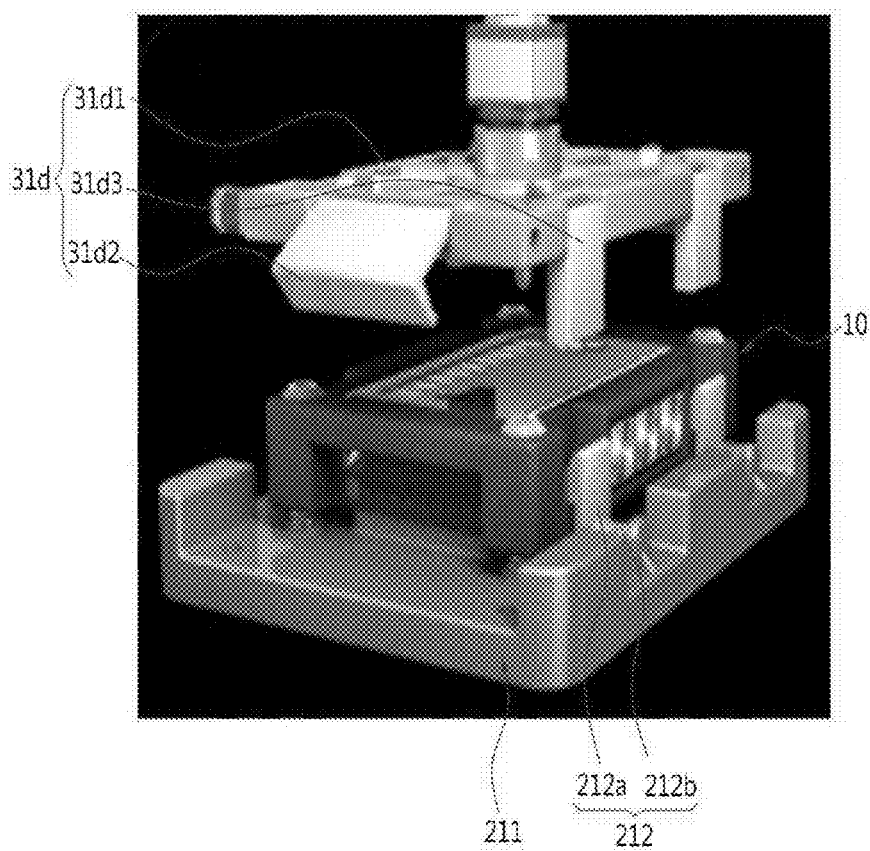
Figure 9A:
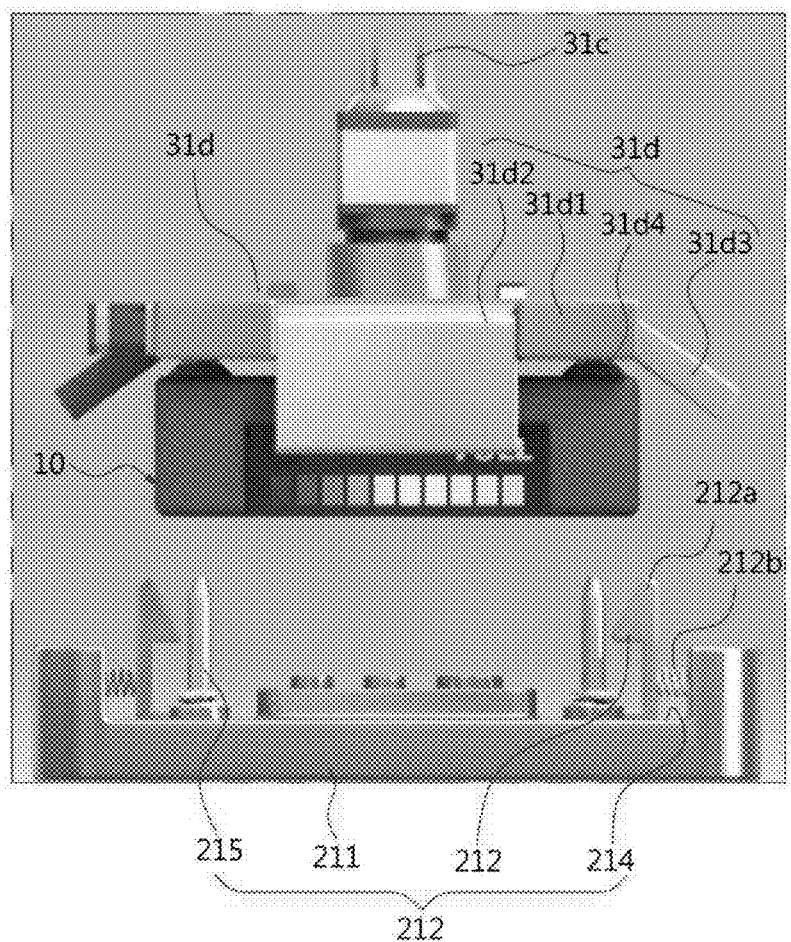
Figure 9B:
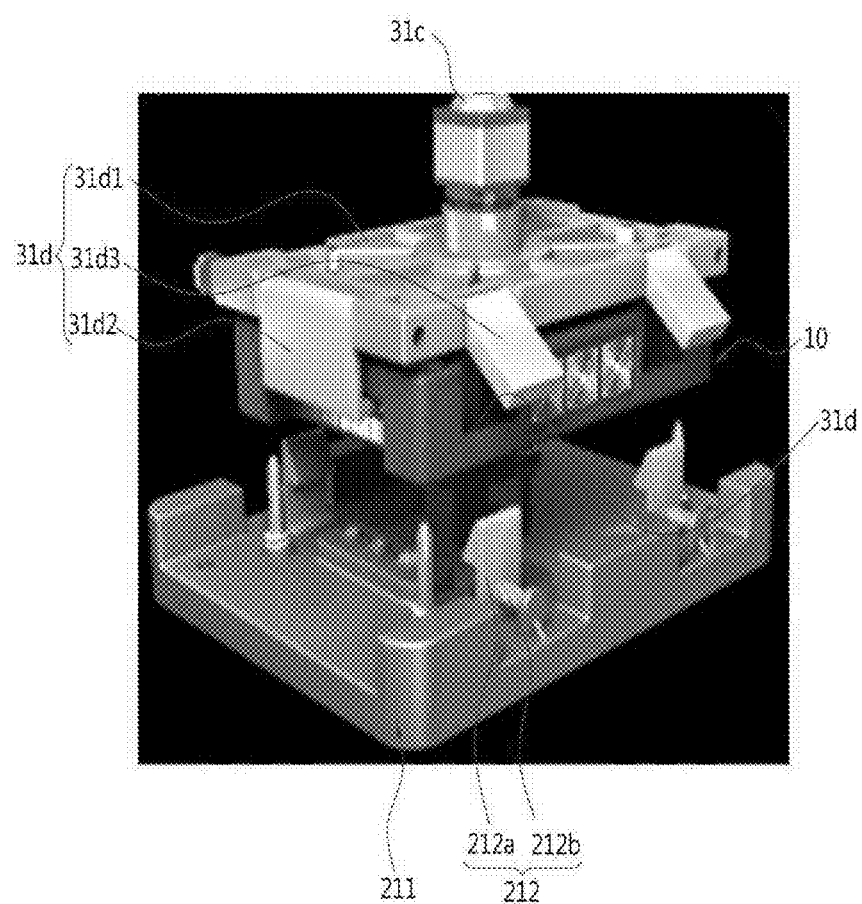

FIGS. 8a to 9b are diagrams explaining structures and operations of a battery replacing robot and a battery mounting module in a battery exchanging type charging station system for an electric vehicle in accordance with an embodiment of the inventive concept. More concretely, FIGS. 8a and 8b are a front view and a perspective view for explaining a process of removing a discharged battery, and FIGS. 9a and 9b are a front view and a perspective view for explaining a process of installing a fully charged battery.

The battery replacing robot 30 is provided in the charging station body 20 to actually perform the replacement operation of the battery. Any transport robot that can be applied in various industrial fields may be adopted as the battery replacing robot 30 without limitation, as long as the replacement operation can be performed effectively.

For example, in the embodiment, the charging station body 20 may be have an approximate "⌐" shape including the vertical body 21 and the horizontal body 22. Thus, the battery replacing robot 30 may be configured to include a battery transporting and mounting robot 31 and a battery ejecting and loading robot 32 so as to be suitable for the structure of the charging station body 20.

The battery transporting and mounting robot 31 may be a robot that removes a discharged battery 10 mounted in the battery mounting module 210 of the electric vehicle and then transports a fully charged battery, which is ejected from the battery loading unit 70, and mounts on the battery mounting module 210. In addition, the battery ejecting and loading robot 32 may be a robot that ejects a fully charged battery stored in the battery loading unit 70 and then provides the fully charged battery to the battery transporting and mounting robot 31, or receives a discharged battery from the battery transporting and mounting robot 31, and then loads into the battery loading unit 70. The battery transporting and mounting robot 31 and the battery ejecting and loading robot 32 may be configured by properly disposing at least a pair of robots, depending on the size of the charging station body 20, a processing scale of the battery 10 and the like.

The battery transporting and mounting robot 31 may be configured to include a fixed rail 31a installed at the upper portion of the charging station body 20, a transporting rail 31b installed to be moved in the direction orthogonal to the fixed rail 31a, an elevating rod 31c installed to be moved along the longitudinal direction of the transporting rail 31b, or in the direction orthogonal to the transporting rail 31b, and a clamping unit 31d installed at the bottom of the elevating rod 31c to perform locking and unlocking operations in the process of replacing the battery. In addition, although the fixed rail 31a, the transporting rail 31b and the elevating rod 31c are not shown in detail in the drawings, it is obvious that driving units which generate power for the rails or apply the power to the rails may be included therein.

Meanwhile, the clamping unit 31d includes a base plate 31d1 installed at the bottom of the of the elevating rod 31c, and a plurality of clamps 31d2 installed at the base plate 31d1 to perform locking and unlocking operations in order to fix or release the battery 10. In addition, the clamps 31d2 may be disposed in pairs to face each other at the edge of the base plate so as to be hooked or released to or from the battery while an angular motion is performed toward an inside or outside thereof. In addition, the clamping unit 31d may include a clamp driving device (not shown) inside the base plate 31d1 in order to drive the clamps.

In addition, the clamping unit 31d includes, at the base plate 31d1, an unclamping member 31d3 for releasing a fixed state of a discharged battery and a position decision member 31d4 for positioning the battery 10 at the base plate 31d1 when the battery mounted on the battery mounting module 210 is released.

The unclamping member 31d3 may be disposed in pairs to face each other at the portion of the base plate 31d1 corresponding to a non-mounted portion of the clamp 31d2. When the battery 10 is released, the unclamping member 31d3 is lowered in a straight state by a clamp driving device (not shown) as shown in FIGS. 8a and 8b. In addition, when a fully charged battery is installed, the unclamping member 31d3 is lowered in an outwardly titled state (an outwardly opened state) as shown in FIGS. 9a and 9b. In addition, the position decision member 31d4 performs a function by which the battery is accurately placed on the bottom of the base plate 31d while being inserted in an upper side of a guide hole formed at the battery. For reference, the mounting position decision member 215 of the battery mounting module 210 to be described later performs a function by which the battery is accurately placed on a battery seating base 211 while being inserted in a lower side of a guide hole formed at the battery.

Meanwhile, the battery mounting module 210 is installed on a frame (not shown) of the electric vehicle, and includes a battery seating base 211 on which the battery is seated, and having a terminal unit which electrically connects the battery, a plurality of fixing units 212 which fix the battery to the battery seating base 211, and a mounting module door 213 (see FIG. 2) installed to seal a portion of the battery seating base 211 and opened when the battery is being replaced.

The mounting module door 213 may be configured to have various types in which the battery seating base 211 on which the battery is seated during an operation can be effectively sealed and be opened when the battery is being replaced to rapidly perform the replacement operation of the battery by the clamping unit 31*d*.

For example, the mounting module door 213 may be closed and opened in front and rear directions of the battery seating base 211 as shown in FIG. 4. In addition, the mounting module door 213 may be closed and opened at the inner space surrounded by the protection guide 23 as briefly shown in FIG. 2, such that the battery is exposed to the external environment as little as possible when the battery 10 is being replaced.

In addition, the battery mounting module 210 may further include a plurality of mounting position decision members 215 configured in the form of pins so as to be inserted guide holes formed in the battery in order for the battery 10 to be positioned and mounted on the battery seating base 211. In addition, the battery fixing unit 212 may be installed at the edge of the battery seating base 211 and configured to include a locking hook 212*a* for fixing the battery and an elastic member 212*b* for maintaining the fixed state by applying an elastic force to the locking hook 212*a*.

In addition, the battery 10 may be formed in the rectangular shape corresponding to the battery seating base 211. That is, a charging module including, for example, a cell inside a body having a shape corresponding to a shape of a seating groove portion 214 may be built in, and a locking groove portion 212 may be installed in order for the locking hook 212*a* to be seated and locked on the edge of the battery Meanwhile, the battery ejecting and loading robot 32 according to the embodiment is configured in an elevating cylinder form that includes a battery elevating rod 32*a* and a loading plate 32*b* formed at the top of the battery elevating rod 32*a* as shown in FIG. 6. However, as long as the battery ejecting and loading robot 32 can eject and load easily and accurately, the structure or type of the battery ejecting and loading robot 32 is not limited.

Figure 10:
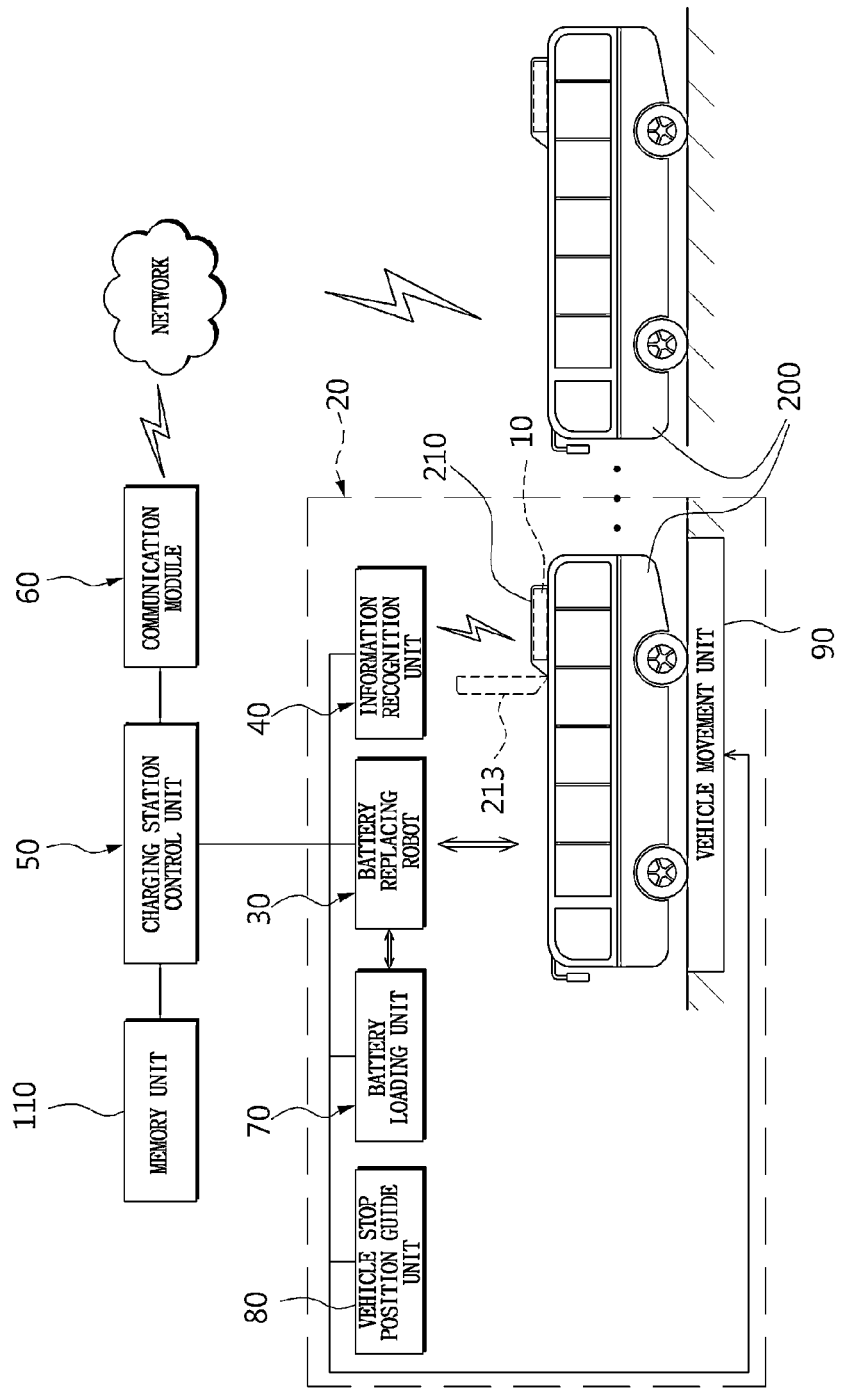
FIG. 10 is a block diagram illustrating a modified example of a battery exchanging type charging station system for an electric vehicle according to an embodiment of the inventive concept.

FIG. 10 is a block diagram illustrating a modified example of a battery exchanging type charging station system for an electric vehicle according to an embodiment of the inventive concept.

In accordance with the inventive concept, the battery exchanging type charging station system for an electric vehicle may further include a vehicle stop position guide unit 80 to guide a stop position of the electric vehicle 200 to enter the charging station body 20 to correspond with a battery exchanging position.

For example, the vehicle stop position guide unit 80 may include an entry detecting unit (not shown) to detect an entry position of the electric vehicle, and notification means (not shown) notifying a driver of position information such as a current position, a battery exchanging position, a moving direction, a moving distance and the like according to detected signals of the entry detecting unit under control of the charging station control unit 50.

At this time, the notification means may be configured to include at least one of a display unit such as a monitor that displays the position information through text, drawings, images and the like, a sound output unit such as a speaker that outputs voice signals so that the driver can confirm by hearing and a lamp unit that flickers with the position information so that the driver can confirm through the flicker of a lamp.

Meanwhile, the battery exchanging type charging station system for an electric vehicle according to the inventive concept may further include a vehicle movement unit 90 that moves an electric vehicle into the exchanging position when the stop position of the electric vehicle does not correspond to the exchanging position.

Such a vehicle movement unit 90 may be configured to have any structures without limitation, as long as the vehicle movement unit is installed on a road that adjoins the charging station body 20, such that it can move the vehicle to a predetermined position when the stop position of the electric vehicle does not correspond to the exchanging position. For example, the vehicle movement unit 90 may be configured by selecting any one of a belt conveyor, a chain conveyor and a roller conveyor, which can be transported in the front and rear direction.

In addition, the battery exchanging type charging station system for an electric vehicle according to the invention concept may further include a memory unit 110 that stores various information such as a use history, a charging history, a revival history, or the like. Thus, management and monitoring can be effectively performed during a period from manufacturing time of the battery to a discard time thereof using the charging station control unit.

The information stored in the memory unit 110 may be used in vehicle management and the like by providing additional service to an owner or a driver through the communication module 60 or offline after being processed by the charging station control unit 50 and the like.

Meanwhile, the battery exchanging type charging station system for an electric vehicle described above has been described based on a configuration in which the electric vehicle is configured with a typical vehicle such as a bus used in public transportation. However, all vehicles such as passenger cars, vans, trucks and the like can be applied to the charging station for an electric vehicle.

Hereinafter, an operation of the battery exchanging type charging station system for an electric vehicle according to an embodiment will be described briefly.

As shown in FIG. 1, when replacement of a battery in the charging station is reserved and a battery type to be replaced, a position of the electric vehicle and the like are input by communicating with a transmitting unit (not shown) provided in the electric vehicle and the communication module 60, the charging station control unit 50 may control the battery replacing robot 30 such that a reserved type of battery may be already prepared by processing data received from the communication module 60. Of course, this procedure may be simplified to only a reserved procedure if there is only one type of battery.

Then, when the electric vehicle enters the charging station body 20, the information recognition unit 40 may recognize information on the entering electric vehicle and apply the information to the charging station control unit 50. According to such obtained information, the charging station control unit 50 may determine whether the electric vehicle is a vehicle reserved for replacing a battery. In this case, when the vehicle is a reserved vehicle, a replacement operation may be performed by driving the battery replacing robot 30 and ejecting a reserved battery. Even if the vehicle is not a reserved vehicle, a control operation may be performed according to information obtained by the information recognition unit 40 or requirements of a driver.

Hereinafter, a replacement procedure of a battery will be described in detail. As shown in FIGS. 2 and 4, first, when an electric vehicle enters the charging station body 20 in a regular position, the battery mounting module 210 is sealed by lowering the protection guide 23 under control of the charging station control unit 50. In the replacement procedure, when a stop position of the electric vehicle is not consistent with a battery exchanging position, the replacement operation may be performed after moving the electric vehicle in the battery exchanging position using a vehicle movement unit 90.

In addition, when the battery mounting module 210 is sealed by the protection guide 23, the mounting module door 213 sealing a portion of the battery seating base 211 is opened and the discharged battery therein is exposed. At this time, a removing process of the discharged battery already mounted on the electric vehicle is first performed by the battery transporting and mounting robot 31. That is, the clamping unit 31*d* is lowered from a regular position of the outlet 22*a* and the discharged battery is locked, separated and removed from the outside according to operations of the transporting rail 31*b* transporting along with the fixed rail 31*a* and the elevating rod 31*c* elevating along with the transporting rail 31*b*. Such a removed discharged battery may be transferred from the battery transporting and mounting robot 31 to the ejecting and loading robot 32 and accepted and stored in the battery loading unit 70. At the same time, another battery transporting and mounting robot 31 for replacing with a charged battery may mount the charged battery transferred from the battery ejecting and loading robot 32 on the battery seating base 211. In addition, when the replacement operation of the charged battery is completed, as shown in FIG. 3, the battery mounting module 210 may be sealed again according to a closing operation of the mounting module door 213, and then the electric vehicle is in a state in which it can be driven again while the replacement operation of the battery is all completed when the protection guide 23 sealing the battery mounting module 210 is elevated.

As described above, in the battery exchanging type charging station system for an electric vehicle according to the inventive concept, since reservation for replacing a battery may be performed in advance and a battery can be rapidly exchanged by a robot while the electric vehicle enters in a state in which a corresponding battery (or a single type of battery) is prepared according to the reservation information, the replacement operation of the battery can be rapidly performed in a short time of 30 seconds, during which passengers can also ride in the electric vehicle if the electric vehicle is applied as a public transportation means.

In the battery exchanging type charging station system for an electric vehicle according to the inventive concept, since reservation for replacing a battery may be performed in advance and a battery can be rapidly exchanged by a robot while the electric vehicle enters in a state in which a corresponding battery (or a single type of battery) is prepared according to the reservation information, the replacement operation of the battery can be rapidly performed in a short time of 30 seconds, during which passengers can also ride in the electric vehicle if the electric vehicle is applied as a public transportation means. In addition, since all the replacement operations can be accurately handled by a robot automatically, convenience and safety can be improved.

Accordingly, since problems for a charging infrastructure that may act as major obstacles to proliferation and activation of electric vehicle can be solved, it is possible to lead the way to proliferation and activation of electric vehicles and promote national interests through a variety of related industrial developments and securement of international competitiveness.

The foregoing is illustrative of embodiments and is not to be construed as limiting thereof. Although a few embodiments have been described, those skilled in the art will readily appreciate that many modifications are possible in embodiments without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures.

What is claimed is:

1. A battery exchanging type charging station system for an electric vehicle, comprising:
    a charging type battery installed on a battery mounting module mounted on an upper portion of the electric vehicle;
    a charging station body formed with a structure in which the electric vehicle freely enters and exits and including a battery loading unit for receiving a battery;
    a battery replacing robot mounted in the charging station body to perform a battery replacement operation; and
    a charging station control unit to control the battery replacing robot such that the battery replacement operation is performed by controlling the battery replacing robot,
    wherein the charging station body is configured to include a vertical body extending in a vertical direction and coming in contact with a road, and a horizontal body extending in a horizontal direction from a top portion of the vertical body toward the road, and a bottom of the horizontal body is provided with at least one outlet for ejecting the battery toward the battery mounting module.

2. The battery exchanging type charging station system according to claim 1, further comprising a communication module configured to receive reservation information on battery replacement from the electric vehicle and provide confirmation information on whether the replacement is possible.

3. The battery exchanging type charging station system according to claim 1, wherein
    the charging station body includes a protection guide configured to seal the battery mounting module with a built-in battery when the electric vehicle enters the charging station body, in order to avoid ill effects according to changes in an external environment when replacing the battery.

4. The battery exchanging type charging station system according to claim 3, wherein
    the protection guide is configured with a corrugate tube that is folded toward the battery mounting module from a state in which the battery is mounted inside the charging station body when the battery is being replaced and that is unfolded to an original position after the battery is replaced.

5. The battery exchanging type charging station system according to claim 3, wherein
    the at least one outlet for ejecting the battery includes the protection guide.

6. The battery exchanging type charging station system according to claim 5, wherein
    the battery loading unit is configured to have any one of a stacked storage rack type included in the vertical body in which a plurality of batteries are arranged so as to be formed in a line at the left and right sides and the batteries are again stacked over the upper side of the line in a multi-layer structure, a parallel storage rack type in which the plurality of batteries are stored in every direction of the horizontal body, and a mixed storage rack type including the stacked storage rack type and the parallel storage rack type.

7. The battery exchanging type charging station system according to claim 1, further comprising:
a vehicle stop position guide unit configured to guide a stop position of the electric vehicle that enters the charging station body to correspond to a battery exchanging position.

8. The battery exchanging type charging station system according to claim 3, wherein
the battery mounting module includes a battery seating base on which the battery is seated and having a terminal unit which electrically connects the battery, a plurality of fixing units which fix the battery to the battery seating base, and a mounting module door installed to seal a portion of the battery seating base and opened when the battery is being replaced.

9. The battery exchanging type charging station system according to claim 8, wherein
the battery mounting module further includes a plurality of mounting position decision members inserted in guide holes formed in the battery such that the battery is accurately placed on the battery seating base, and the battery fixing unit is installed at the edge of the battery seating base and configured to include a locking hook for fixing the battery and an elastic member for maintaining the fixed state by applying an elastic force to the locking hook.

10. The battery exchanging type charging station system according to claim 8, wherein
the mounting module door is closed and opened at the inner space surrounded by the protection guide such that the battery is not exposed to the external environment when the battery is being replaced.

11. The battery exchanging type charging station system according to claim 1, wherein the battery replacing robot includes:
a battery transporting and mounting robot that removes a discharged battery mounted in the battery mounting module and then transports a fully charged battery, which is ejected from the battery loading unit, and mounts the fully charged battery on the battery mounting module; and
a battery ejecting and loading robot that ejects the fully charged battery stored in the battery loading unit and then provides the fully charged battery to the battery transporting and mounting robot, or receives the discharged battery from the battery transporting and mounting robot, and then loads the discharged battery into the battery loading unit.

12. The battery exchanging type charging station system according to claim 2, wherein the battery replacing robot includes:
a battery transporting and mounting robot that removes a discharged battery mounted in the battery mounting module and then transports a fully charged battery, which is ejected from the battery loading unit, and mounts the fully charged battery on the battery mounting module; and
a battery ejecting and loading robot that ejects the fully charged battery stored in the battery loading unit and then provides the fully charged battery to the battery transporting and mounting robot, or receives the discharged battery from the battery transporting and mounting robot, and then loads the discharged battery into the battery loading unit.

13. The battery exchanging type charging station system according to claim 3, wherein the battery replacing robot includes:
a battery transporting and mounting robot that removes a discharged battery mounted in the battery mounting module and then transports a fully charged battery, which is ejected from the battery loading unit, and mounts the fully charged battery on the battery mounting module; and
a battery ejecting and loading robot that ejects the fully charged battery stored in the battery loading unit and then provides the fully charged battery to the battery transporting and mounting robot, or receives the discharged battery from the battery transporting and mounting robot, and then loads the discharged battery into the battery loading unit.

14. The battery exchanging type charging station system according to claim 4, wherein the battery replacing robot includes:
a battery transporting and mounting robot that removes a discharged battery mounted in the battery mounting module and then transports a fully charged battery, which is ejected from the battery loading unit, and mounts the fully charged battery on the battery mounting module; and
a battery ejecting and loading robot that ejects the fully charged battery stored in the battery loading unit and then provides the fully charged battery to the battery transporting and mounting robot, or receives the discharged battery from the battery transporting and mounting robot, and then loads the discharged battery into the battery loading unit.

15. The battery exchanging type charging station system according to claim 5, wherein the battery replacing robot includes:
a battery transporting and mounting robot that removes a discharged battery mounted in the battery mounting module and then transports a fully charged battery, which is ejected from the battery loading unit, and mounts the fully charged battery on the battery mounting module; and
a battery ejecting and loading robot that ejects the fully charged battery stored in the battery loading unit and then provides the fully charged battery to the battery transporting and mounting robot, or receives the discharged battery from the battery transporting and mounting robot, and then loads the discharged battery into the battery loading unit.

16. The battery exchanging type charging station system according to claim 6, wherein the battery replacing robot includes:
a battery transporting and mounting robot that removes a discharged battery mounted in the battery mounting module and then transports a fully charged battery, which is ejected from the battery loading unit, and mounts the fully charged battery on the battery mounting module; and
a battery ejecting and loading robot that ejects the fully charged battery stored in the battery loading unit and then provides the fully charged battery to the battery transporting and mounting robot, or receives the discharged battery from the battery transporting and mounting robot, and then loads the discharged battery into the battery loading unit.

17. The battery exchanging type charging station system according to claim 7, wherein the battery replacing robot includes:
a battery transporting and mounting robot that removes a discharged battery mounted in the battery mounting module and then transports a fully charged battery, which is ejected from the battery loading unit, and mounts the fully charged battery on the battery mounting module; and a battery ejecting and loading robot that ejects the fully charged battery stored in the battery loading unit and then provides the fully charged battery to the battery transporting and mounting robot, or receives the discharged battery from the battery transporting and mounting robot, and then loads the discharged battery into the battery loading unit.

18. The battery exchanging type charging station system according to claim 8, wherein the battery replacing robot includes:

a battery transporting and mounting robot that removes a discharged battery mounted in the battery mounting module and then transports a fully charged battery, which is ejected from the battery loading unit, and mounts the fully charged battery on the battery mounting module; and a battery ejecting and loading robot that ejects the fully charged battery stored in the battery loading unit and then provides the fully charged battery to the battery transporting and mounting robot, or receives the discharged battery from the battery transporting and mounting robot, and then loads the discharged battery into the battery loading unit.

19. The battery exchanging type charging station system according to claim 11, wherein the battery transporting and mounting robot includes a fixed rail installed at the upper portion of the charging station body, a transporting rail installed to be moved in a direction orthogonal to the fixed rail, an elevating rod installed to be moved along the longitudinal direction of the transporting rail, or in a direction orthogonal to the transporting rail, and a clamping unit installed at the bottom of the elevating rod to perform locking and unlocking operations in the process of replacing the battery.

20. The battery exchanging type charging station system according to claim 12, wherein the battery transporting and mounting robot includes a fixed rail installed at the upper portion of the charging station body, a transporting rail installed to be moved in a direction orthogonal to the fixed rail, an elevating rod installed to be moved along the longitudinal direction of the transporting rail, or in a direction orthogonal to the transporting rail, and a clamping unit installed at the bottom of the elevating rod to perform locking and unlocking operations in the process of replacing the battery.

\* \* \* \* \*